(12) United States Patent
Narutaki et al.

(10) Patent No.: US 12,479,669 B2
(45) Date of Patent: Nov. 25, 2025

(54) STOPPER, ROLLER CONVEYOR, AND BELT CONVEYOR

(71) Applicant: KYOWA MANUFACTURING CO., LTD., Hyogo (JP)

(72) Inventors: Takeru Narutaki, Hyogo (JP); Toshihiro Miyazaki, Hyogo (JP)

(73) Assignee: KYOWA MANUFACTURING CO., LTD., Hyogo (JP)

( * ) Notice: Subject to any disclaimer, the term of this patent is extended or adjusted under 35 U.S.C. 154(b) by 55 days.

(21) Appl. No.: 18/721,407

(22) PCT Filed: Dec. 20, 2021

(86) PCT No.: PCT/JP2021/046977
§ 371 (c)(1),
(2) Date: Jun. 18, 2024

(87) PCT Pub. No.: WO2023/119355
PCT Pub. Date: Jun. 29, 2023

(65) Prior Publication Data
US 2025/0122028 A1    Apr. 17, 2025

(51) Int. Cl.
*B65G 47/88* (2006.01)

(52) U.S. Cl.
CPC .................. *B65G 47/8815* (2013.01)

(58) Field of Classification Search
None
See application file for complete search history.

(56) References Cited

U.S. PATENT DOCUMENTS

| | | | | |
|---|---|---|---|---|
| 2,180,163 A | * | 11/1939 | Milmoe | B65B 35/20 198/468.8 |
| 2,926,770 A | * | 3/1960 | Hallam | B07C 5/16 198/463.4 |
| 2,993,623 A | * | 7/1961 | Bendot | B65G 47/295 221/298 |
| 4,088,221 A | * | 5/1978 | Bowser | B65G 47/8815 198/780 |
| 4,487,309 A | * | 12/1984 | Dorner | B23Q 7/1426 198/463.4 |
| 4,838,171 A | * | 6/1989 | Yokoi | B61B 13/125 104/165 |

(Continued)

FOREIGN PATENT DOCUMENTS

EP    2 354 046 B1    8/2016
JP    H02-018220 A    1/1990

(Continued)

OTHER PUBLICATIONS

International Search Report issued in PCT/JP2021/046977; mailed Mar. 8, 2022.

(Continued)

*Primary Examiner* — Joseph A Dillon, Jr.
(74) *Attorney, Agent, or Firm* — Studebaker Brackett PLLC

(57) ABSTRACT

A stopper according to the present invention stops an object moving along a travel path, and includes: a stop member for stopping the object; and a retractable unit that moves the stop member in and out of the travel path by a cam mechanism.

10 Claims, 8 Drawing Sheets

(56) References Cited

U.S. PATENT DOCUMENTS

| | | | | |
|---|---|---|---|---|
| 4,878,578 A * | 11/1989 | Brouwer | ............... | B65G 47/268 |
| | | | | 198/725 |
| 5,178,258 A * | 1/1993 | Smalley | ................ | B65G 27/30 |
| | | | | 198/750.8 |
| 5,211,276 A | 5/1993 | Clopton | | |
| 6,370,447 B1 * | 4/2002 | Miyazaki | ............... | B65G 43/10 |
| | | | | 198/349.8 |
| 7,232,025 B1 * | 6/2007 | Warren | .............. | B65G 47/8823 |
| | | | | 193/35 A |
| 7,237,449 B2 * | 7/2007 | Kato | ........................ | B23Q 1/58 |
| | | | | 74/25 |
| 8,083,049 B2 * | 12/2011 | Novak | ................... | B65G 57/06 |
| | | | | 193/35 A |
| 9,004,259 B1 * | 4/2015 | Corn | .................. | B65G 47/8815 |
| | | | | 198/530 |
| 9,371,075 B2 * | 6/2016 | Ihrefors | ............ | B65G 47/8823 |
| 10,407,252 B1 * | 9/2019 | Villanueva Vargas | ....................... | |
| | | | | B65G 47/642 |
| 10,898,980 B2 * | 1/2021 | Higuchi | ............... | A47B 13/081 |
| 11,897,704 B2 * | 2/2024 | Dunten | ............. | B65G 47/8846 |
| 12,168,579 B2 * | 12/2024 | Cruz-Ruiz | ............... | B65G 13/02 |
| 2003/0173187 A1 * | 9/2003 | Johnson | ............... | B65G 47/266 |
| | | | | 198/459.6 |
| 2005/0139450 A1 * | 6/2005 | Behnke | .................. | B65G 47/26 |
| | | | | 198/459.1 |
| 2011/0062000 A1 | 3/2011 | Yamamoto | | |
| 2014/0262684 A1 * | 9/2014 | Skanse | .................. | B65G 47/54 |
| | | | | 198/369.6 |
| 2018/0178335 A1 * | 6/2018 | Higuchi | ................ | B23Q 1/522 |

FOREIGN PATENT DOCUMENTS

| | | |
|---|---|---|
| JP | 2002-255337 A | 9/2002 |
| JP | 5659745 B2 | 1/2015 |
| JP | 2018-158826 A | 10/2018 |
| JP | 2018-177441 A | 11/2018 |
| WO | 2009/139068 A1 | 11/2009 |

OTHER PUBLICATIONS

The extended European search report issued by the European Patent Office on Dec. 16, 2024, which corresponds to European Patent Application No. 21968793.6-1017 and is related to U.S. Appl. No. 18/721,407.

* cited by examiner

STANDBY STATE
(RETRACTED STATE)

OPERATING STATE
(EXTENDED STATE)

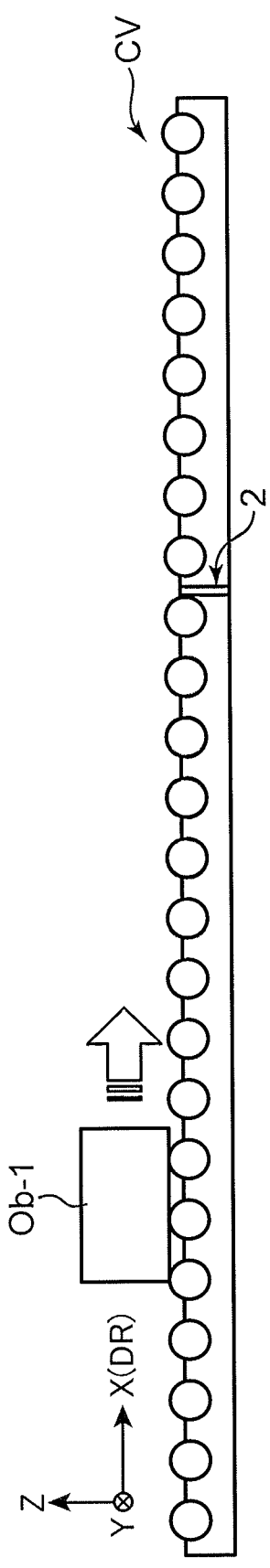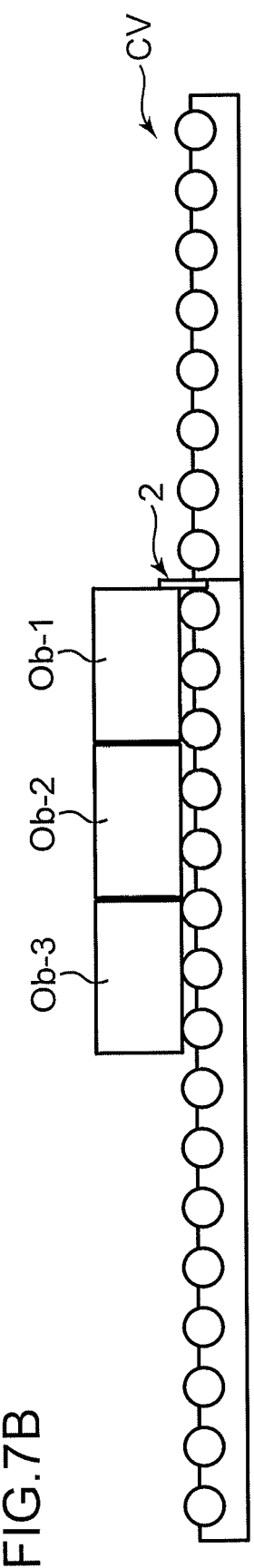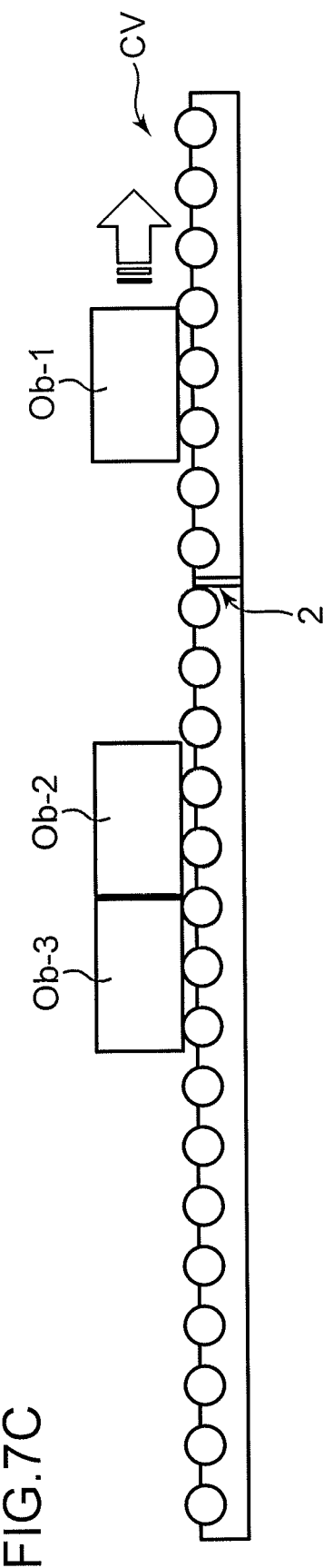

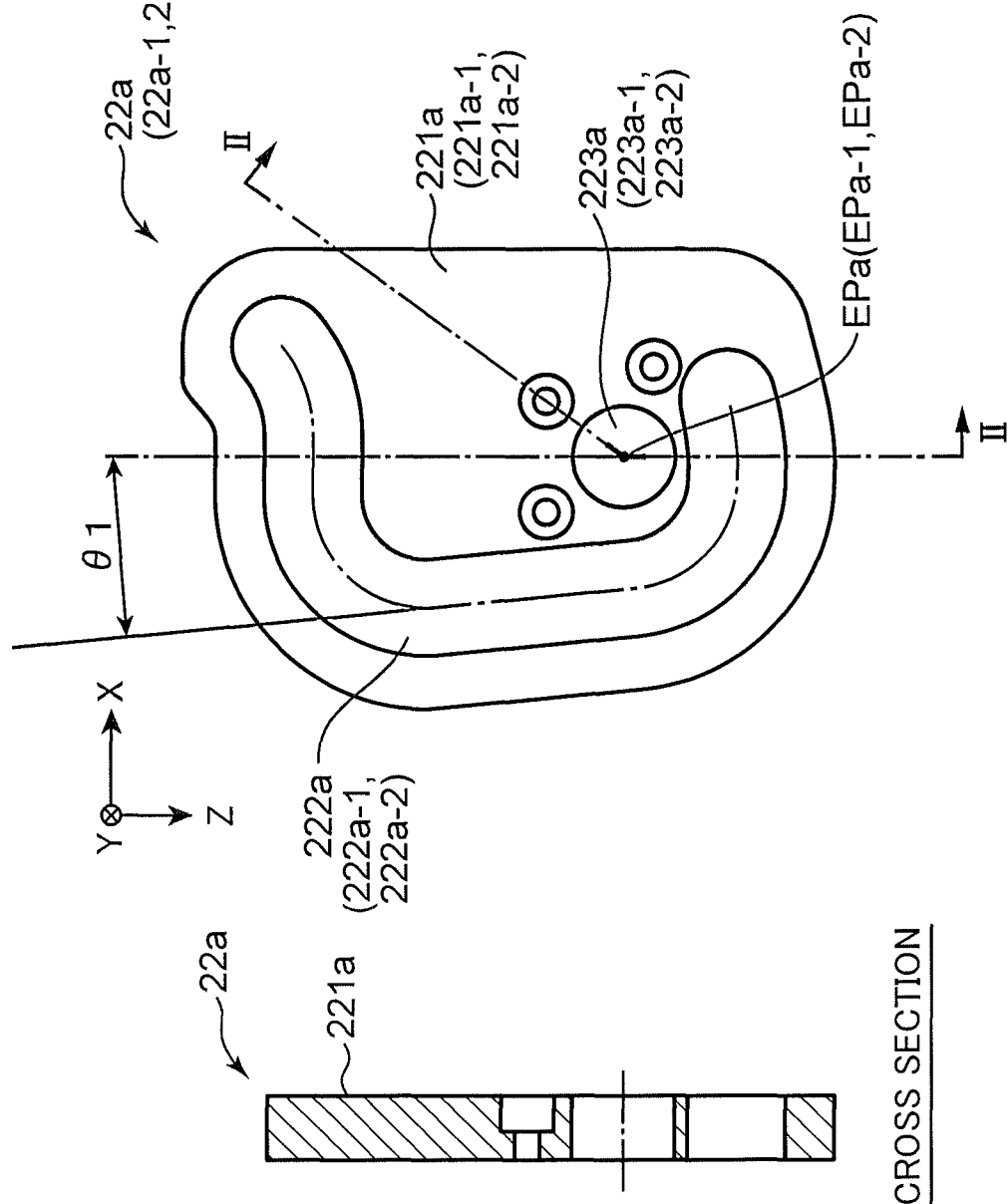

STOPPER, ROLLER CONVEYOR, AND BELT CONVEYOR

TECHNICAL FIELD

The present invention relates to a stopper that stops an object moving along a travel path, and a roller conveyor and a belt conveyor including the stopper.

BACKGROUND ART

There is known a roller conveyor including a plurality of rollers juxtaposed along one direction, the roller conveyor moving (conveying) an object (conveyance object) on the plurality of rollers as a travel path (conveyance path). This roller conveyor is used in various industrial fields depending on the type of object, such as a distribution center, a food line, a production line of industrial products, a mail center, and a delivery center.

Regarding this roller conveyor, there is a case where it is desired to stop the object as necessary in order to transfer the object moving along one roller conveyor to the other roller conveyor, temporarily store a plurality of objects on the roller conveyor, adjust the orientation of the object on the roller conveyor, and the like. Therefore, the roller conveyor may be provided with a stopper, and for example, Patent Literature 1 discloses a stopper including an air cylinder.

The stopper including the air cylinder disclosed in Patent Literature 1 has an advantage that the stopper can be disposed in the middle of a plurality of rollers and operated at a necessary timing, but has a disadvantage that supply of air is required to drive the cylinder. It is also necessary to airtightly form a supply path of air.

CITATION LIST

Patent Literature

Patent Literature 1: JP 2018-177441 A

SUMMARY OF INVENTION

The present invention has been made in view of the above circumstances, and an object thereof is to provide a stopper not requiring supply of air, and a roller conveyor and a belt conveyor including the stopper.

A stopper according to the present invention is a stopper that stops an object moving along a travel path, the stopper including: a stop member for stopping the object; and a retractable unit that moves the stop member in and out of the travel path by a cam mechanism. The roller conveyor and the belt conveyor according to the present invention include such a stopper.

The above and other objects, features, and advantages of the present invention will become apparent from the following detailed description and the accompanying drawings.

BRIEF DESCRIPTION OF DRAWINGS

FIG. 7 is a view for describing an example of operation in the roller conveyor including the stopper.

FIG. 8 is a view for describing a modified form of a groove cam used in the stopper.

DESCRIPTION OF EMBODIMENTS

Hereinafter, one or a plurality of embodiments of the present invention will be described with reference to the drawings. However, the scope of the invention is not limited to the disclosed embodiments. Note that in each drawing, the configuration given an identical reference sign is an identical configuration, and description thereof will be appropriately omitted. In the present description, a generic term is indicated by a reference sign with a suffix omitted, and an individual configuration is indicated by a reference sign with a suffix.

A stopper in an embodiment is a stopper that stops an object moving along a travel path, the stopper including: a stop member for stopping the object; and a retractable unit that moves the stop member in and out of the travel path by a cam mechanism. Such a stopper may be used for various travel paths depending on the type of object, but here, as an example, the stopper will be described regarding a case where the stopper is used for a roller conveyor including a plurality of rollers juxtaposed along one direction. In this case, the stopper is disposed so as to move the stop member in and out at least one of between two rollers adjacent to each other among the plurality of rollers and outside the one direction in a roller positioned at an end of the plurality of rollers. Hereinafter, the stopper and the roller conveyor including the stopper will be described more specifically.

Figure 1:
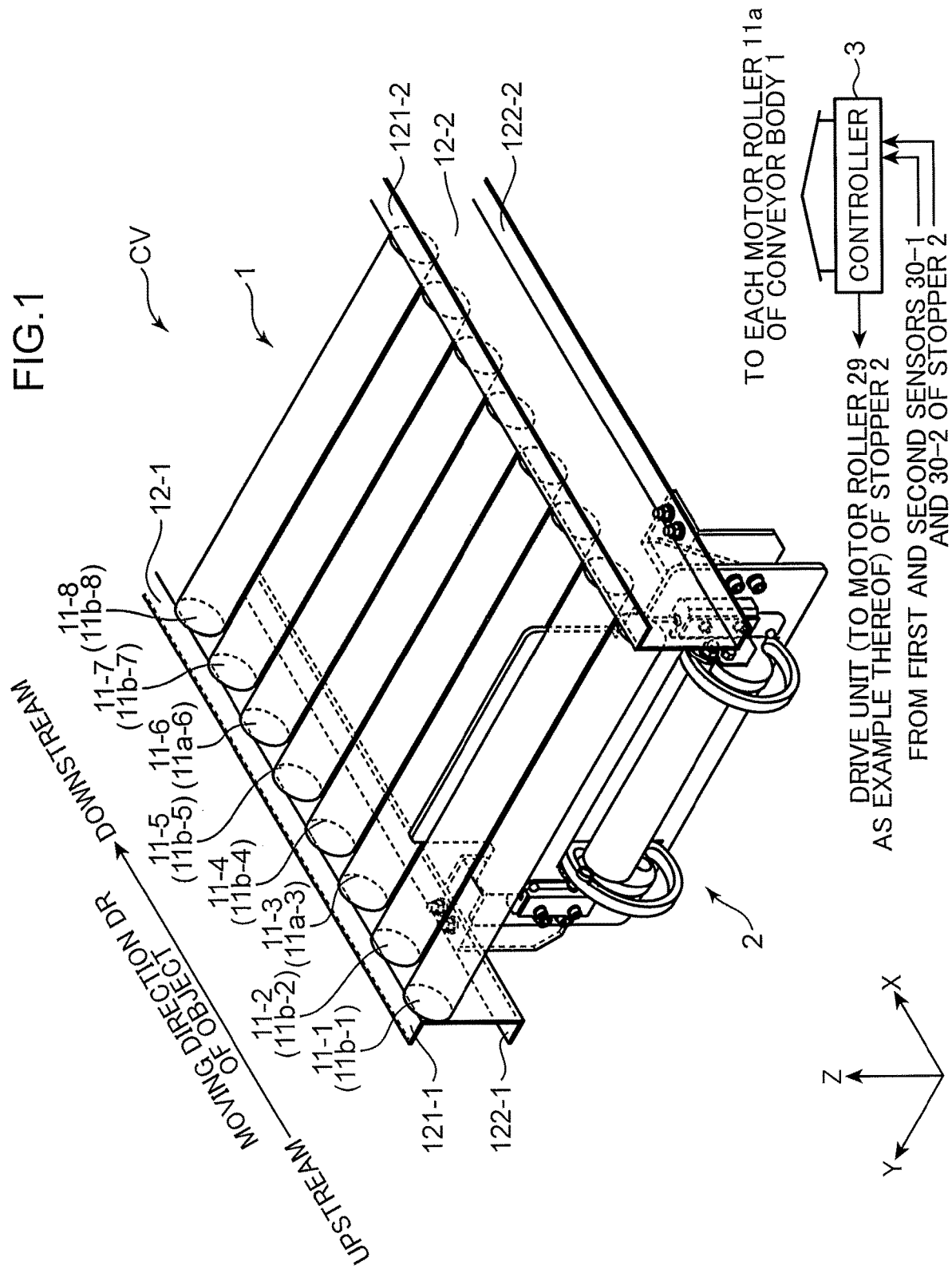
FIG. 1 is a view for describing a configuration of a roller conveyor in an embodiment.
Figure 2:
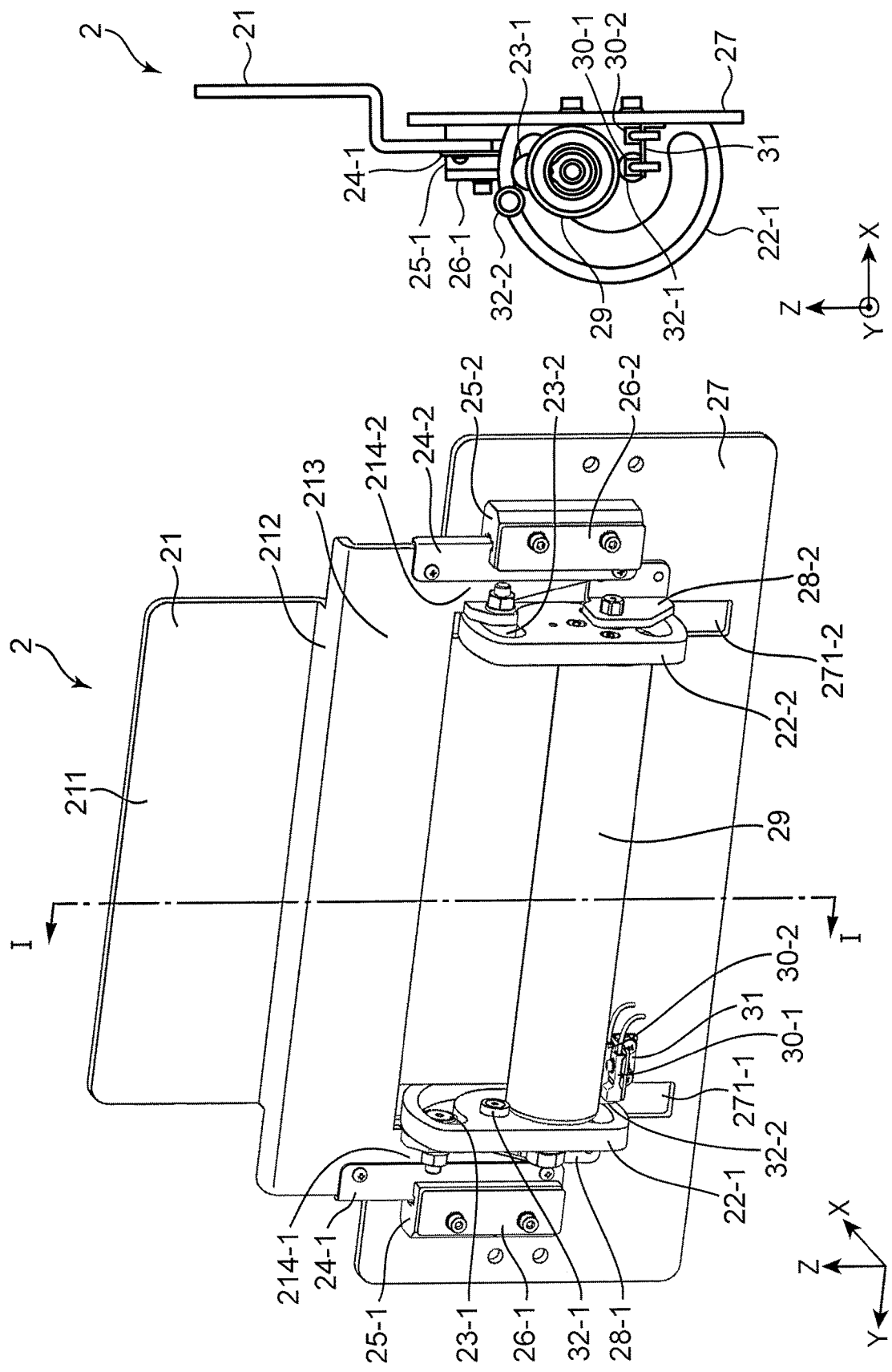
FIG. 2 is a view for describing a configuration of a stopper included in the roller conveyor.
Figure 3:
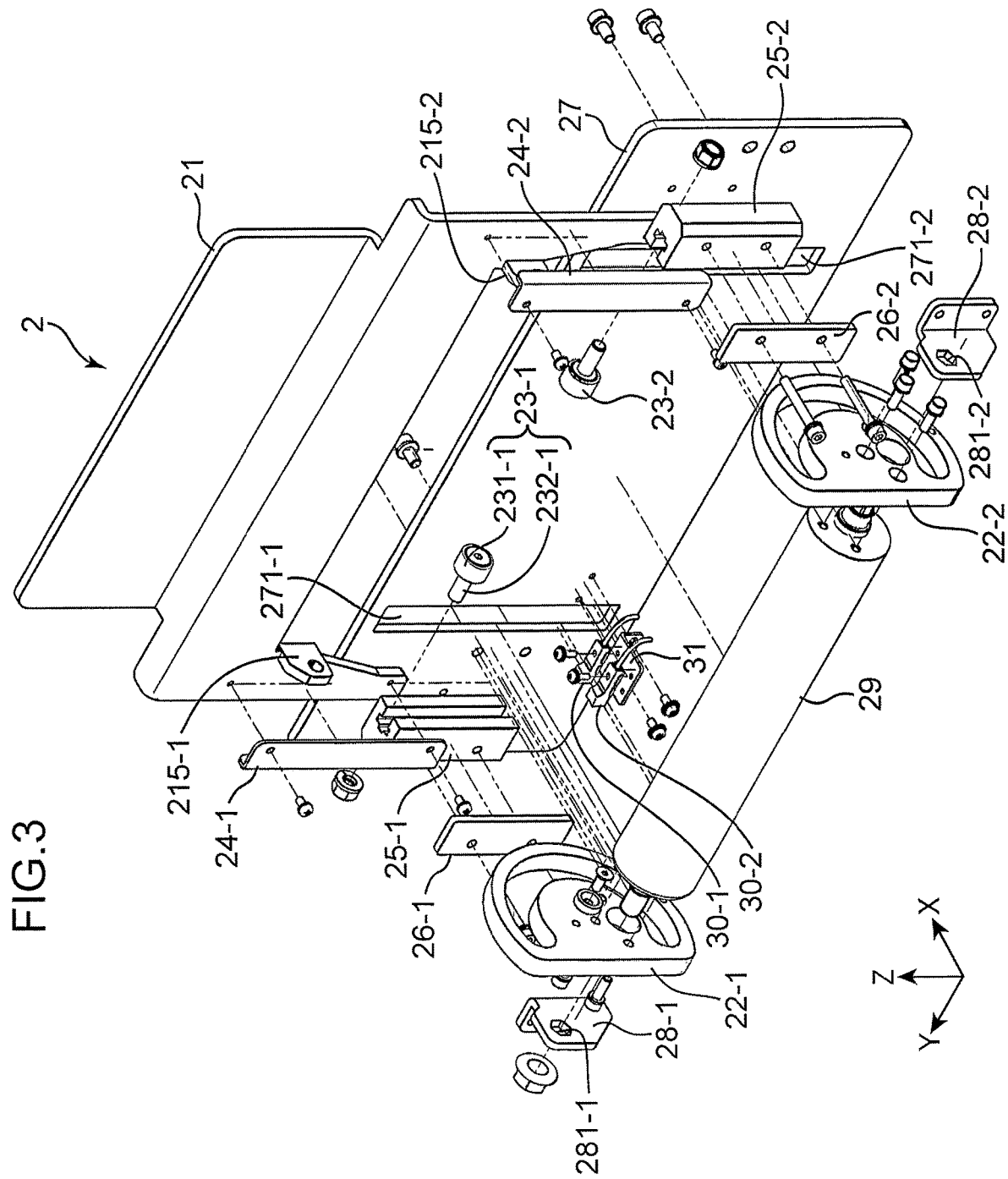
FIG. 3 is an exploded perspective view of the stopper.
Figure 4A:
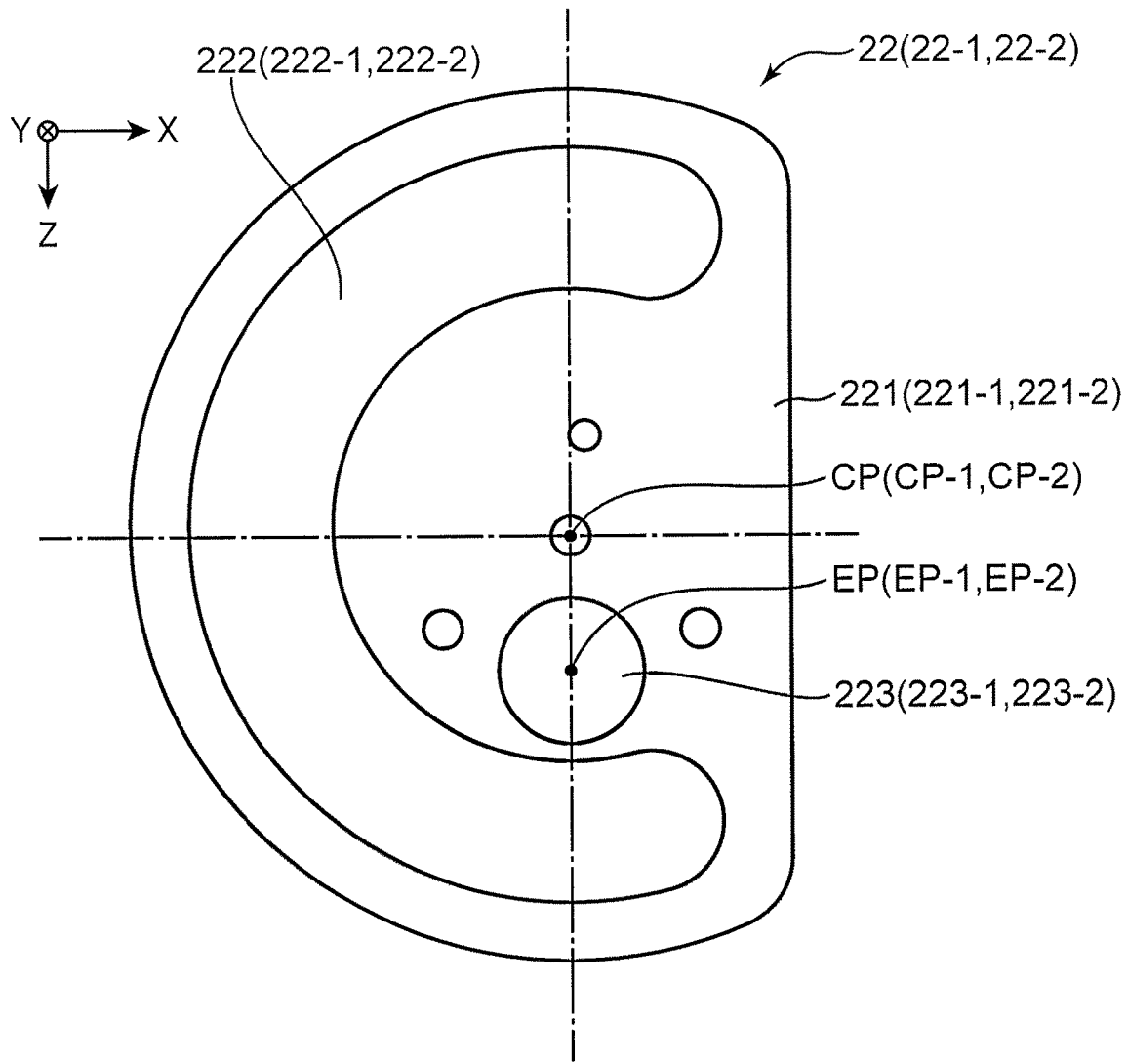
FIG. 4 is a view for describing a groove cam and a cam follower in the stopper.
Figure 4B:
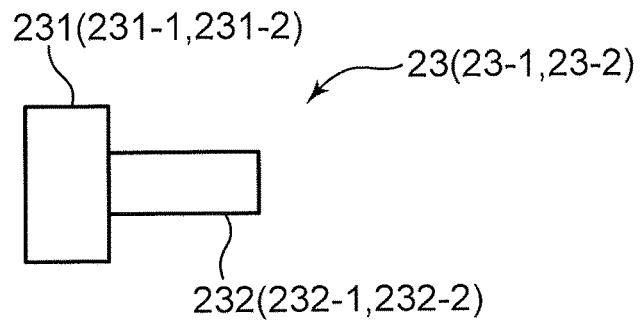
Figure 5A:
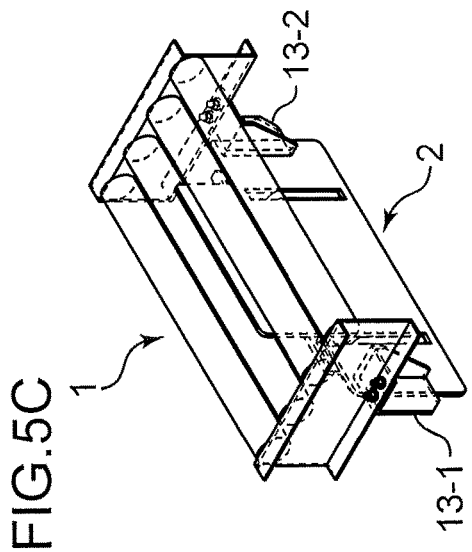
FIG. 5 is a schematic view illustrating a roller conveyor around an attachment location of the stopper.
Figure 5B:
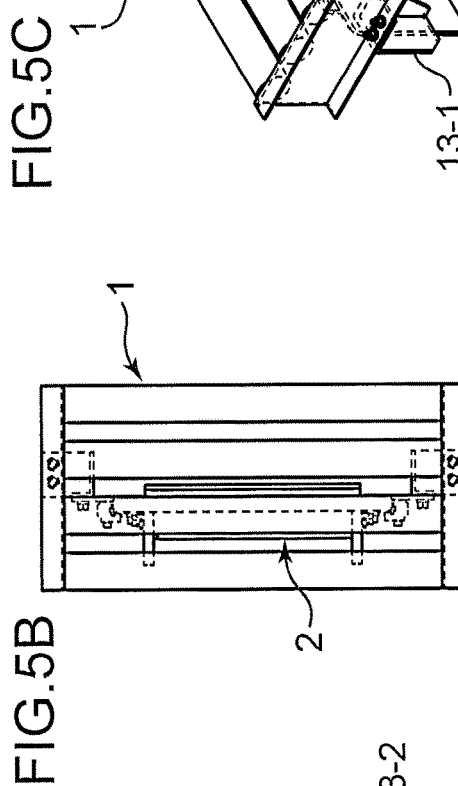
Figure 5C:
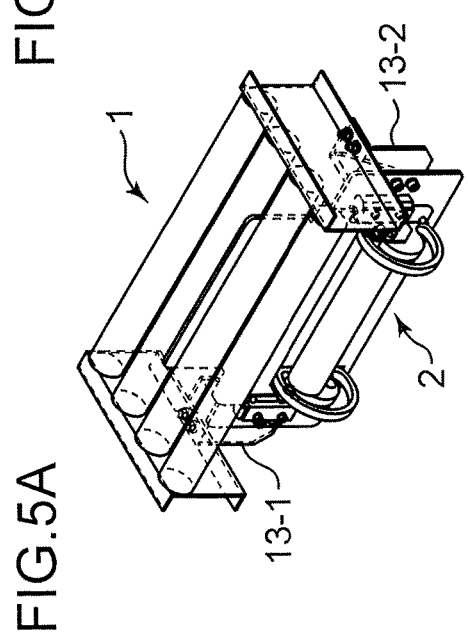
Figure 5D:
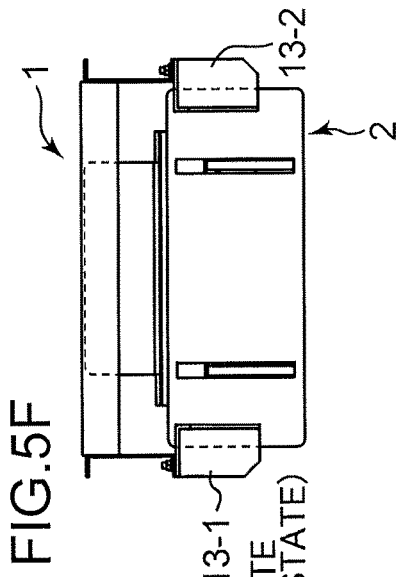
Figure 5E:
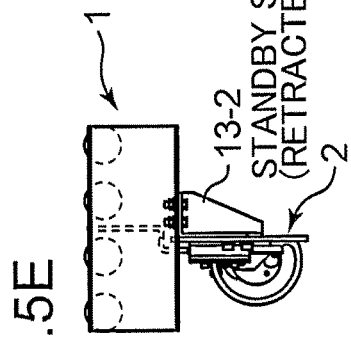
Figure 5F:
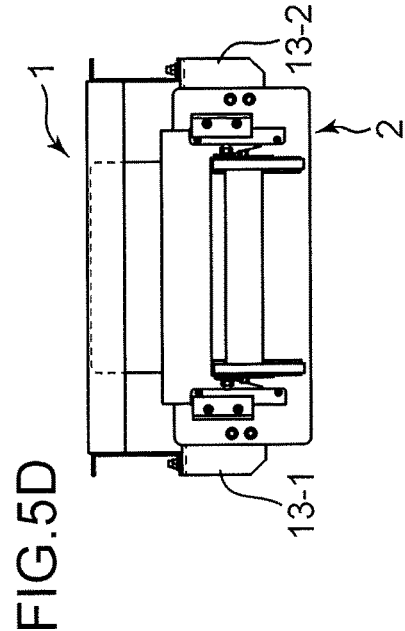
Figure 5G:
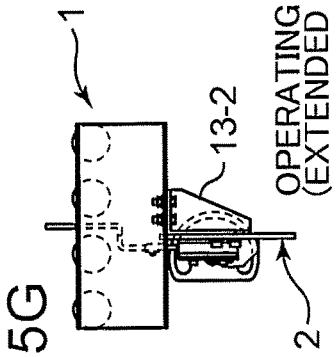

FIG. 1 is a view for describing the configuration of a roller conveyor in an embodiment. FIG. 2 is a view for describing the configuration of a stopper included in the roller conveyor. FIG. 2A is a perspective view of the stopper in an operating state (extended state), and FIG. 2B is a side view of a partial cross section viewed from a cross-section line I-I illustrated in FIG. 2A in a standby state (retracted state). The cross section of FIG. 2B is a plane parallel to an XZ plane. FIG. 3 is an exploded perspective view of the stopper. FIG. 4 is a view for describing a groove cam and a cam follower in the stopper. FIG. 4A is a plan view of the groove cam, and FIG. 4B is a side view of the cam follower. FIG. 5 is a schematic view illustrating a roller conveyor around an attachment location of the stopper. FIGS. 5A to 5F illustrate a case where the stopper is in the standby state (retracted state), and FIG. 5G illustrates a case where the stopper is in the operating state (extended state). Assuming that a side on which a drive unit (motor roller as an example thereof) of the stopper is visually recognizable is an upstream side, FIG. 5A is a perspective view as viewed from the upstream side, FIG. 5B is a top view, FIG. 5C is a perspective view as viewed from a downstream side, FIG. 5D is a plan view (front view) as viewed from the upstream side, FIG. 5E is a right side view with respect to a direction from the upstream side toward the downstream side, and FIG. 5F is a plan view (rear view) as viewed from the downstream side. FIG. 5G is a right side view with respect to the direction from the upstream side toward the downstream side. FIG. 6 is a perspective view illustrating the standby state (retracted state) and the operating state (extended state) in the stopper.

Figure 6A:
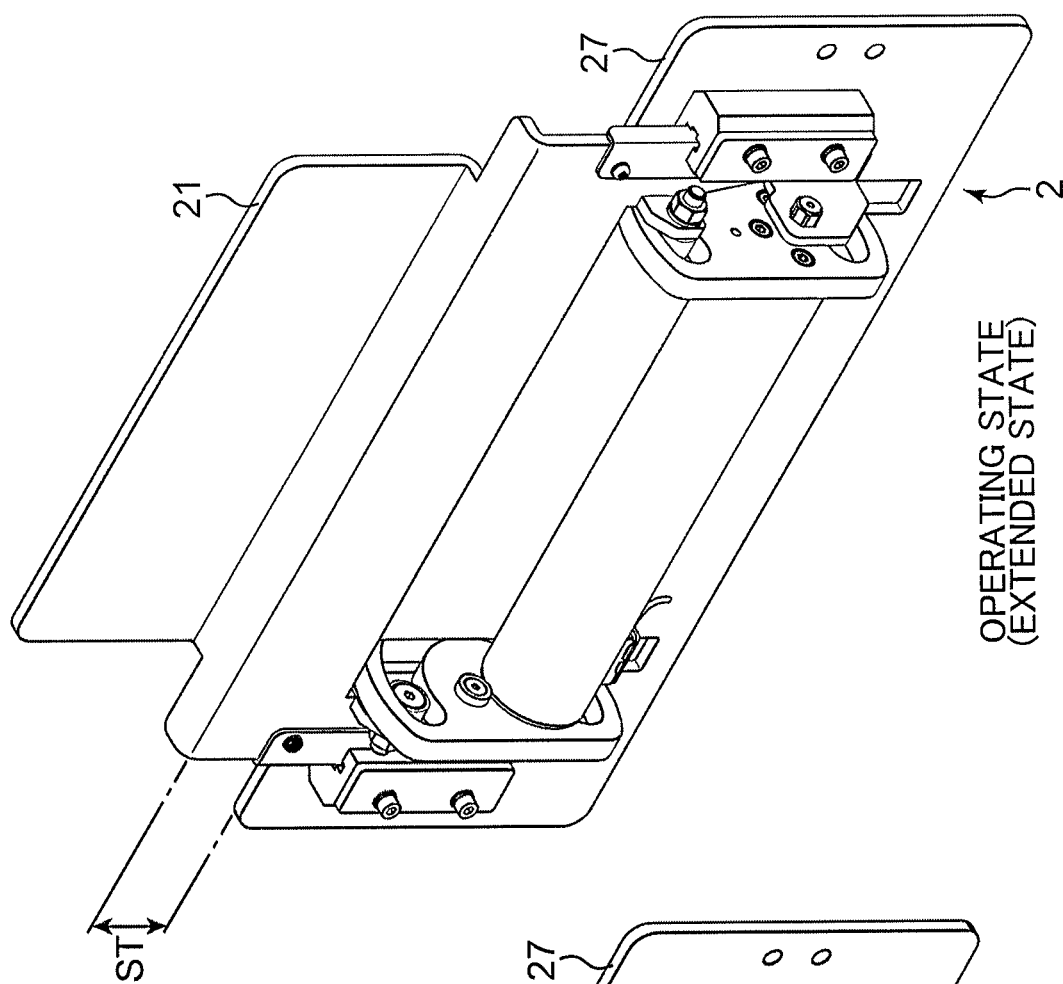
FIG. 6 is a perspective view illustrating a standby state (retracted state) and an operating state (extended state) in the stopper.
Figure 6B:
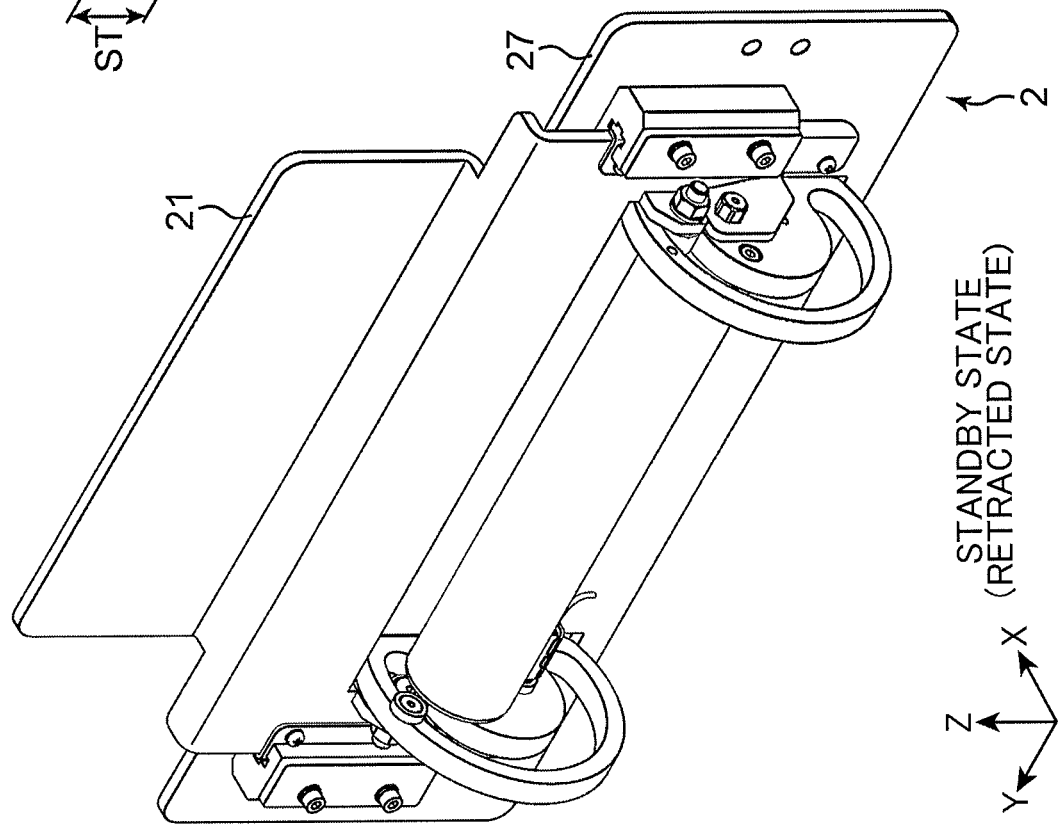

FIG. 6A illustrates a case where the stopper is in the standby state (retracted state), and FIG. 6B illustrates a case where the stopper is in the operating state (extended state). In FIGS. 1 to 3 and 6, an XYZ orthogonal coordinate system is illustrated in order to clarify the directional relationship. Note that the X direction is a direction (horizontal direction) along a moving direction DR illustrated in FIG. 1A in which an object moves by a roller conveyor CV, the Z direction is a height direction (vertical direction) orthogonal to the X direction, and the Y direction is a direction (width direction and depth direction) orthogonal to the X direction and the Z direction.

The roller conveyor CV in the embodiment includes, for example, a conveyor body 1, a stopper 2, and a controller 3 as illustrated in FIGS. 1 and 6.

The conveyor body 1 is a device that forms a travel path (conveyance path) on which a predetermined object (conveyance object) moves (conveys), and includes a plurality of rollers 11 sequentially juxtaposed along one direction, and moves the object with the one direction as the moving direction DR and on the plurality of rollers 11 as the travel path. In the example illustrated in FIG. 1, the plurality of rollers 11 are sequentially juxtaposed along the X direction as the one direction. Note that FIG. 1 illustrates a part of the conveyor body 1 including eight rollers 11-1 to 11-8, with the remaining part omitted. The plurality of rollers 11 are arranged at predetermined intervals (first intervals) in a direction (Y direction in the example illustrated in FIG. 1) orthogonal to the one direction in a horizontal plane, and are rotatably and axially supported by a pair of first and second frames 12-1 and 12-2, which are plate-like members elongated along the one direction. The first and second frames 12-1 and 12-2 respectively includes flange portions (extending portions) 121-1 and 122-1; 121-2 and 122-2 extending outward along the Y direction with respect to the plurality of rollers 11 juxtaposed from respective end parts in the vertical direction (Z direction in the example illustrated in FIG. 1). In the first and second frames 12-1 and 12-2, which are plate-like members elongated along the X direction, the respective flange portions 121-1 and 122-1; 121-2 and 122-2 improve the strength in the Y direction and the Z direction, which are two directions orthogonal to the X direction. The plurality of rollers 11 include a plurality of driving rollers 11a that generate driving force by themselves and rotate, and a plurality of driven rollers 11b that rotate by driving force from the others. The plurality of driving rollers 11a are arranged at predetermined intervals (second intervals) along the one direction, and one or a plurality of the driven rollers 11b are arranged between the driving rollers 11a adjacent to each other. In the example illustrated in FIG. 1, the plurality of driving rollers 11a (11a-3 and 11a-6) are arranged every two, and two of the driven rollers 11b (11b-1 and 11b-2; 11b-4 and 11b-5; 11b-7 and 11b-8) are arranged between the driving rollers 11a adjacent to each other.

The driving roller 11a is a motor roller incorporating a motor driven by receiving power supply, for example. A motor roller for a roller conveyor used in this roller conveyor CV is known, and is disclosed in, for example, Patent Literature 1 or WO2009/139068 A. This motor roller includes, for example, a tubular roller pipe (drum) whose both end parts are closed by a pair of first and second side plates rotatably attached via a bearing member such as a bearing to a pair of first and second shaft bodies fixed to the pair of first and second frames 12-1 and 12-2. The roller pipe internally accommodates a built-in motor attached to one of the first and second shaft bodies, for example, an internal frame fixed to the first shaft body and a reducer attached to an output shaft of the built-in motor, and the roller pipe is attached and fixed to the output shaft of the reducer. The first shaft body fixed to the internal frame is hollow, a cable (wiring) having one end connected to the controller 3 internally passes through the hollow from the outside, and the cable is connected to the built-in motor at the other end thereof. The built-in motor is driven by power supplied via the cable, and the driving force generated by the built-in motor is transmitted to the roller pipe via the reducer to axially rotate the roller pipe about the first and second shaft bodies as rotation axes.

Note that in the above, the driving roller 11a is a motor roller incorporating a motor, but the driving roller 11a may be of a type externally including a motor and driving the roller by transmitting a driving force of the external motor to the roller by, for example, a pulley and a belt, or, for example, a gear.

The driven roller 11b is known, and is disclosed in, for example, Patent Literature 1 or WO2009/139068 A described above. This driven roller 11b is configured to include, for example, a tubular roller pipe (drum) whose both end parts are closed by a pair of first and second side plates rotatably attached via a bearing member such as a bearing to a pair of first and second shaft bodies fixed to the pair of first and second frames 12-1 and 12-2. Such a driven roller 11b is rotated by a frictional force with the object having moved by the driving roller 11a. Alternatively, each of the driving roller 11a and the driven roller 11b includes a pulley around which a belt is stretched at one end, and the driving force of the driving roller 11a is transmitted to the driven roller 11b via the pulley of the driving roller 11a, the belt, and the pulley of the driven roller 11b, and the driven roller 11b is rotated.

The stopper 2 is a device that stops an object moving along a travel path. The stopper 2 can also cancel the stop after stopping the object. In the present embodiment, the travel path is formed with the plurality of rollers 11 in the conveyor body 1. For example, as illustrated in FIGS. 1 to 6, this stopper 2 includes a stop member 21 for stopping the object, and a retractable unit that moves the stop member 21 in and out of the travel path by a cam mechanism. The cam mechanism includes a groove cam 22 forming a cam groove 222 of a recess or a through opening, and a cam follower 23 guided by the cam groove 222 and engaged with the stop member 21. The cam groove 222 has an arc shape in a plane formed by a first straight line along the moving direction DR of the travel path and a second straight line along the moving in-out direction. In the examples illustrated in FIGS. 1 to 6, the moving direction DR is the X direction, the first straight line is a straight line parallel to the X axis, the moving in-out direction is the Z direction, the second straight line is a straight line parallel to the Z axis, and a plane formed by the first and second straight lines is the XZ plane (plane parallel to the XZ plane). The retractable unit further includes a drive unit that axially drives the groove cam 22 about, as a rotation axis, a third straight line passing through an eccentric point EP eccentric from a center point CP of the arc shape and extending along a normal direction of the plane. In the examples illustrated in FIGS. 1 to 6, the normal direction of the plane is the Y direction, and the third straight line is a straight line parallel to the Y axis. The drive unit is a motor roller for a roller conveyor used for a roller conveyor and incorporating a motor.

More specifically, the stop member 21 is a plate-like member. In the examples illustrated in FIGS. 1 to 6, the stop member 21 includes a first surface part 211 forming a first surface parallel to the YZ plane and flat, a step part 212 bent by about 90 degrees in the X direction from the first surface part 211 and further bent by about 90 degrees in the Z direction to extend, a second surface part 213 extending from the step part 212 and forming a second surface parallel to the YZ plane and flat, a pair of first and second rail holding portions 214-1 and 214-2 extending in the Z direction from respective end parts in the Y direction of the second surface part 213, and a pair of first and second cam follower holding portions 215-1 and 215-2 protruding in a flange shape in the X direction from respective root parts of the first and second rail holding portions 214-1 and 214-2. Therefore, the stop member 21 has a step at the step part 212, and a space is formed between the first and second cam follower holding portions 215-1 and 215-2 with a predetermined interval (third interval) along the Y direction, whereby the retractable unit can be disposed in this space. A first rail 24-1, which is a plate-like member elongated in the Z direction, is fixed to the first rail holding portion 214-1 with, for example, a screw, and the first rail holding portion 214-1 holds the first rail 24-1. One end part in the Y direction of the plate-like first rail 24-1 is bent by about 90 degrees in the X direction, and covers an outer end surface in the Y direction of the first rail holding portion 214-1. Therefore, the first rail 24-1 has a substantially L-shape in a cross section parallel to the XY plane (cross section of the XY plane). Similarly, a second rail 24-2, which is a plate-like member elongated in the Z direction, is fixed to the second rail holding portion 214-2 with, for example, a screw, and the second rail holding portion 214-2 holds the second rail 24-2. One end part in the Y direction of the plate-like second rail 24-2 is bent by about 90 degrees in the X direction, and covers an outer end surface in the Y direction of the second rail holding portion 214-2. Therefore, the second rail 24-2 has a substantially L-shape in a cross section on the XY plane.

The stopper 2 includes a pair of first and second rail guides 25-1 and 25-2, which are columnar members. On one side surface of each of the first and second rail guides 25-1 and 25-2, a recessed stripe extending in an extension direction of the columnar shape and recessed inward is formed. The first and second rail guides 25-1 and 25-2 are fixed and attached to a base plate 27 by, for example, screws by a pair of first and second guide attachment plates 26-1 and 26-2, respectively, with the extension direction of the columnar shape aligned with the Z direction at an interval (fourth interval) corresponding to the length in the Y direction from the first rail holding portion 214-1 to the second rail holding portion 214-2 such that the respective recessed stripes face each other. In the recessed stripe of the first rail guide 25-1, the first rail 24-1 held by the first rail holding portion 214-1 is slidably fitted in a part of the outer end part in the Y direction such that one end part bent by about 90 degrees faces the bottom surface of the recessed stripe, and in the recessed stripe of the second rail guide 25-2, the second rail 24-2 held by the second rail holding portion 214-2 is slidably fitted in a part of the outer end part in the Y direction such that one end part bent by about 90 degrees faces the bottom surface of the recessed stripe. When the stop member 21 and the base plate 27 as described above are viewed from the Z direction (moving in-out direction), the step part 212 of the stop member 21 overlaps an end surface at one end in the Z direction of the base plate 27.

In the examples illustrated in FIGS. 1 to 6, the groove cam 22 is configured to include a pair of first and second groove cams 22-1 and 22-2. Since these first and second groove cams 22-1 and 22-2 have the same shape, they will be mainly described below as the groove cam 22 with reference to FIG. 4A. As illustrated in FIG. 4A, the groove cam 22 is configured to include a groove cam body 221, which is a plate-like member in which a part of a circular shape is cut out. In the plate-like groove cam body 221, an arc-shaped cam groove 222, which is a recess or a through opening, a through opening in the example illustrated in FIG. 4A, is formed. A shaft body insertion opening part 223, which is a through opening for inserting a shaft body of a motor roller 29 as an example of the drive unit, is formed at a position of the eccentric point EP eccentric by a predetermined distance from the center point CP of the arc shape. The center point CP of the arc shape coincides with a center point in a case where the groove cam body 221 is not cut and is circular. The circumferential length of the cam groove 222 (size of a center angle of the arc shape), the radius of the cam groove 222, and the position of the eccentric point EP are appropriately set according to a moving in-out length of the first surface part 211 in the stop member 21 with respect to the travel path.

The base plate 27 is a plate-like member. The base plate 27 is rectangular in one example. As described above, in a state where the pair of first and second rails 24-1 and 24-2 respectively held by the pair of first and second rail holding portions 214-1 and 214-2 in the stop member 21 are slidably fitted into the respective recessed stripes of the pair of first and second rail guides 25-1 and 25-2 attached to the base plate 27, this base plate 27 is provided with a first groove cam passage opening part 271-1 of a rectangular through opening extending in the Z direction in a space between the first and second rail holding portions 214-1 and 214-2 and inside in the Y direction of the first rail holding portion 214-1 in order to allow the first groove cam 22-1 to pass through, and a second groove cam passage opening part 271-2 of a rectangular through opening extending in the Z direction in a space between the first and second rail holding portions 214-1 and 214-2 and inside in the Y direction of the second rail holding portion 214-2 in order to allow the second groove cam 22-2 to pass through. Between this first groove cam passage opening part 271-1 and the first rail guide 25-1, in order not to interfere with the first rail holding portion 214-1 and the first rail 24-1 during moving in and out of the stop member 21, a plate-like first axial support member 28-1 having a substantially L-shape in a cross section of the XY plane is fixed and attached to the base plate 27 with, for example, a screw at one end part of the substantially L-shape. The other end part of the substantially L-shape of the first axial support member 28-1 is provided with a first axial support opening part 281-1 of a through opening for axially supporting the shaft body of the motor roller 29 as an example of the drive unit. Similarly, between the second groove cam passage opening part 271-2 and the second rail guide 25-2, in order not to interfere with the second rail holding portion 214-2 and the second rail 24-2 during moving in and out of the stop member 21, a plate-like second axial support member 28-2 having a substantially L-shape in a cross section of the XY plane is fixed and attached to the base plate 27 with, for example, a screw at one end part of the substantially L-shape. The other end part of the substantially L-shape of the second axial support member 28-2 is provided with a second axial support opening part 281-2 of a through opening for axially supporting the shaft body of the motor roller 29 as an example of the drive unit.

The motor roller 29 corresponds to an example of the drive unit, and is for a roller conveyor used for the roller conveyor CV in the present embodiment. Similarly to the driving roller 11*a*, for example, this motor roller 29 includes a tubular roller pipe (drum) whose both end parts are closed by a pair of first and second side plates rotatably attached via a bearing member such as a bearing to a pair of first and second shaft bodies. The roller pipe internally accommodates a built-in motor attached to one of the first and second shaft bodies, for example, an internal frame fixed to the first shaft body and a reducer attached to an output shaft of the built-in motor, and the roller pipe is attached and fixed to the output shaft of the reducer. The first shaft body fixed to the internal frame is hollow, a cable (wiring) having one end connected to the controller 3 internally passes through the hollow from the outside, and the cable is connected to the built-in motor at the other end thereof. The built-in motor is driven by power supplied via the cable, and the driving force generated by the built-in motor is transmitted to the roller pipe via the reducer to axially rotate the roller pipe about the first and second shaft bodies as rotation axes. The motor roller 29 used in this stopper 2 is shorter in length than the roller 11 used in the conveyor body 1. In the motor roller 29, the first shaft body is fixed to the first axial support member 28-1 at the first axial support opening part 281-1 via the first groove cam 22-1 by inserting the first shaft body into a first shaft body insertion opening part 223-1 of the first groove cam 22-1, and the second shaft body is fixed to the second axial support member 28-2 at the second axial support opening part 281-2 via the second groove cam 22-2 by inserting the second shaft body into a second shaft body insertion opening part 223-2 of the second groove cam 22-2. Due to this, the first groove cam 22-1, the motor roller 29, and the second groove cam 22-2 are attached to the base plate 27 such that the pair of first and second groove cams 22-1 and 22-2 can pass through the pair of first and second groove cam passage opening parts 271-1 and 271-2, respectively. Then, the roller pipe of the motor roller 29 is fixed and attached to the first groove cam 22-1 with, for example, a screw at one end thereof, and is fixed and attached to the second groove cam 22-2 with, for example, a screw at the other end thereof. Due to this, the first groove cam 22-1 is attached to one end of the roller pipe in the motor roller 29 such that a first groove cam body 221-1 is parallel to the XZ plane, and the first cam groove 222-1 has an arc shape in a plane (in the XZ plane in the examples illustrated in FIGS. 1 to 6) formed by the first straight line along the moving direction DR (X direction in the examples illustrated in FIGS. 1 to 6) of the travel path and the second straight line along the moving in-out direction (Z direction in the examples illustrated in FIGS. 1 to 6). Similarly, the second groove cam 22-2 is attached to the other end of the roller pipe in the motor roller 29 such that the second groove cam body 221-2 is parallel to the XZ plane, and a second cam groove 222-2 has an arc shape in a plane (in the XZ plane in the examples illustrated in FIGS. 1 to 6) formed by the first straight line along the moving direction DR (X direction in the examples illustrated in FIGS. 1 to 6) of the travel path and the second straight line along the moving in-out direction (Z direction in the examples illustrated in FIGS. 1 to 6).

In the examples illustrated in FIGS. 1 to 6, the cam follower 23 is configured to include a pair of first and second cam followers 23-1 and 23-2. Since these first and second cam followers 23-1 and 23-2 have the same shape, they will be mainly described below as the cam follower 23 with reference to FIG. 4B. As illustrated in FIG. 4B, the cam follower 23 includes a cylindrical shaft portion 232 and a cylindrical columnar follower body 231 rotatably attached with respect to the shaft portion 232 via, for example, a needle bearing at one end of the shaft portion 232. Therefore, the diameter of the shaft portion 232 is shorter than the diameter of the follower body 231. The diameter of the follower body 231 is slightly shorter than the radial length (width) of the cam groove 222 so as to be movably fitted into the cam groove 222.

The first cam follower 23-1 is guided by the first cam groove 222-1 of the first groove cam 22-1 and is engaged with the stop member 21. The second cam follower 23-2 is guided by the second cam groove 222-2 of the second groove cam 22-2 and is engaged with the stop member 21. In the examples illustrated in FIGS. 1 to 6, a first follower body 231-1 of the first cam follower 23-1 is movably fitted into the first cam groove 222-1 of the first groove cam 22-1, and the other end of the first shaft portion 232-1 in the first cam follower 23-1 is fixed and attached to the first cam follower holding portion 215-1 of the stop member 21 with, for example, a screw. Similarly, a second follower body 231-2 of the second cam follower 23-2 is movably fitted into the second cam groove 222-2 of the second groove cam 22-2, and the other end of the second shaft portion 232-2 in the second cam follower 23-2 is fixed and attached to the second cam follower holding portion 215-2 of the stop member 21 with, for example, a screw.

These first and second rails 24-1 and 24-2, the first and second rail guides 25-1 and 25-2, the first and second guide attachment plates 26-1 and 26-2, the first and second axial support members 28-1 and 28-2, the motor roller 29, the first and second groove cams 22-1 and 22-2, and the first and second cam followers 23-1 and 23-2 constitute an example of the retractable unit, and correspond to an example of the retractable unit. The first and second rails 24-1 and 24-2, the first and second rail guides 25-1 and 25-2, the first and second groove cams 22-1 and 22-2, and the first and second cam followers 23-1 and 23-2 constitute an example of the cam mechanism, and correspond to an example of the cam mechanism. The first and second groove cams 22-1 and 22-2 correspond to an example of a so-called driver, the first and second rails 24-1 and 24-2 and the first and second cam followers 23-1 and 23-2 correspond to an example of a so-called follower, and the first and second rail guides 25-1 and 25-2 correspond to an example of a so-called fixing node. Note that the first and second rail holding portions 214-1 and 214-2 that hold the first and second rails 24-1 and 24-2 may also be included in the retractable unit. In this case, the first and second rail holding portions 214-1 and 214-2 are included in the follower.

Then, in the present embodiment, the stopper 2 further includes first and second sensors 30-1 and 30-2, a sensor holding portion 31, and first and second sensor dogs 32-1 and 32-2 in order to detect a movement state of the groove cam 22, i.e., the movement state of the first groove cam 22-1 in the examples illustrated in FIGS. 1 to 6. Each of the first and second sensors 30-1 and 30-2 is a sensor for detecting a rotational position of the first groove cam 22-1 as the movement state of the first groove cam 22-1, and is, for example, an inductive proximity sensor. The sensor holding portion 31 is a plate-like member having a substantially L-shape in a cross section parallel to the XZ plane (cross section of the XZ plane), and holds the first and second sensors 30-1 and 30-2. More specifically, the sensor holding portion 31 holds the first and second sensors 30-1 and 30-2 by sequentially juxtaposing the first and second sensors 30-1 and 30-2 in the X direction on one end part of the substantially L-shape, and is fixed and attached to the base plate 27 with, for example, a screw at the other end part of the substantially L-shape below in the Z direction the motor roller 29 so that the first and second sensors 30-1 and 30-2 face the first groove cam 22-1. The first sensor dog 32-1 is a member for operating the first sensor 30-1, and the second sensor dog 32-2 is a member for operating the second sensor 30-2. When the first and second sensors 30-1 and 30-2 are inductive proximity sensors, the first and second sensor dogs 32-1 and 32-2 are short, high cylindrical members made of metal (including alloy) for bringing them close to the respective first and second sensors 30-1 and 30-2 relative to the first groove cam body 221-1 of the first groove cam 22-1 and for generating an induced current to flow. When the stop member 21 is in the retracted state (standby state) as illustrated in FIG. 6A, the first sensor dog 32-1 is fixed and attached to the first groove cam body 221-1 of the first groove cam 22-1 with, for example, a screw as illustrated in FIG. 2B at a position (first position) facing the first sensor 30-1. When the stop member 21 is in the extended state (operating state) as illustrated in FIG. 6B, the second sensor dog 32-2 is fixed and attached to the first groove cam body 221-1 of the first groove cam 22-1 with, for example, a screw as illustrated in FIG. 2B at a position (second position) facing the second sensor 30-2.

The stopper 2 having such a configuration is disposed with respect to the travel path such that the stop member 21 is retracted from the travel path in the standby state (retracted state) illustrated in FIG. 6A and the stop member 21 is moved out to the travel path in the operating state (extended state) illustrated in FIG. 6B. In the present embodiment, since the travel path is formed with the plurality of rollers 11 in the conveyor body 1, at least one of between two of the rollers 11 adjacent to each other among the plurality of rollers 11 and outside the one direction in a roller 11 positioned at an end of the plurality of rollers 11, i.e., between the two rollers 11-1 and 11-2 adjacent to each other in the examples illustrated in FIGS. 1 to 6, the stopper 2 is attached and disposed on the conveyor body 1 by a pair of first and second stopper holding portions 13-1 and 13-2 such that the stop member 21 is retracted from the travel path formed with the plurality of rollers 11 in the standby state as illustrated in FIG. 5E, and the stop member 21 moves out to the travel path in the operating state as illustrated in FIG. 5G. More specifically, each of the first and second stopper holding portions 13-1 and 13-2 is a plate-like member having a substantially right triangle shape, and each end part of each of the two sides sandwiching the right angle is bent at substantially 90 degrees. Therefore, each of the first and second stopper holding portions 13-1 and 13-2 has a substantially L-shape in a cross section of the XZ plane and a substantially L-shape in a cross section of the XY plane. The first stopper holding portion 13-1 is fixed and attached to the flange portion 122-1 of the first frame 12-1 with, for example, a screw at one end part of the substantially L-shape in the cross section of the XZ plane, and the second stopper holding portion 13-2 is fixed and attached to the flange portion 122-2 of the second frame 12-2 with, for example, a screw at one end part of the substantially L-shape in the cross section of the XZ plane. Then, as described above, the first stopper holding portion 13-1 is fixed and attached to the base plate 27 with, for example, a screw at one end part of the substantially L-shape in the cross section of the XY plane, and the second stopper holding portion 13-2 is fixed and attached to the base plate 27 with, for example, a screw at one end part of the substantially L-shape in the cross section of the XY plane so that the stop member 21 can move in and out with respect to the travel path.

The controller 3 is a device that is connected to each of the driving rollers 11a of the conveyor body 1 and controls each of the driving rollers 11a. For example, in response to a control signal from a host system (not illustrated) of the roller conveyor CV, an input from an operation panel (not illustrated) of the controller 3, or the like, the controller 3 performs control of rotating the driving roller 11a forward at a predetermined rotation speed, control of rotating the driving roller 11a backward at a predetermined rotation speed, or the like. The forward rotation is a rotation direction of the driving roller 11a in which the object is transferred in the moving direction DR. Such a controller 3 is known, and is disclosed in, for example, Patent Literature 1 or WO2013/057767 A described above. Then, in the present embodiment, since the stopper 2 uses the motor roller 29 as an example of the drive unit, the controller 3 is connected to the motor roller 29 and each of the first and second sensors 30-1 and 30-2 of the stopper 2, and controls the motor roller 29 in response to detection signals of the first and second sensors 30-1 and 30-2.

In the stopper 2 having such a configuration, in the case of the standby state (retracted state), for example, upon receiving an instruction to the operating state (extended state) from the host system or the operation panel, the controller 3 controls the motor roller 29 of the stopper 2 to rotate forward until receiving a detection signal from the second sensor 30-2. By this control, the motor roller 29 rotates forward. That is, the built-in motor of the motor roller 29 is driven, and, via the reducer of the motor roller 29, the roller pipe of the motor roller 29 rotates forward, as rotation axes, with the first and second shaft bodies of the motor roller 29 fixed to the first and second axial support members 28-1 and 28-2, respectively. When the roller pipe of the motor roller 29 rotates forward, the first and second groove cams 22-1 and 22-2 fixed to the roller pipe of the motor roller 29 are driven. That is, the first and second groove cams 22-1 and 22-2 pass through the eccentric points EP-1 and EP-2 eccentric from the center points CP-1 and CP-2 of the respective arc shapes of the first and second cam grooves 222-1 and 222-2, and axially rotate about the third straight line along the normal direction (Y direction) of the XZ plane as a rotation axis. When the first and second groove cams 22-1 and 22-2 rotate, the first and second cam followers 23-1 and 23-2 are respectively guided by the first and second cam grooves 222-1 and 222-2 to move. That is, the respective first and second follower bodies 231-1 and 231-2 of the first and second cam followers 23-1 and 23-2 respectively fitted in the first and second cam grooves 222-1 and 222-2 move along the first and second cam grooves 222-1 and 222-2, respectively, from one end to the other end in the circumferential direction, and thus the respective first and second shaft portions 232-1 and 232-2 of the first and second cam followers 23-1 and 23-2 also move. These movements are transmitted to the stop member 21 via the first and second cam follower holding portions 215-1 and 215-2 fixed and attached to the first and second shaft portions 232-1 and 232-2 of the first and second cam followers 23-1 and 23-2, respectively, and the stop member 21 also moves with these movements of the first and second cam followers 23-1 and 23-2. Here, the movement of the stop member 21 is restricted (guided) to movement in the Z direction by the first and second rail guides 25-1 and 25-2, and the stop member 21 moves in the Z direction by a predetermined length ST as illustrated in FIG. 6, for example, and the first surface part 211 of the stop member 21 moves out to the travel path. Then, when the second sensor 30-2 detects the second sensor dog 32-2, the second sensor 30-2 transmits a detection signal to the controller 3, and in response to reception of this detection signal, the controller 3 stops forward rotation of the motor roller 29 as described above.

Note that in the above description, the controller 3 may confirm that the stopper 2 is in the standby state by confirming the detection of the first sensor dog 32-1 by the first sensor 30-1 before starting forward rotation of the motor roller 29.

In the stopper 2 described above, the predetermined length ST, which is the movement amount of the stop member 21, can be adjusted by adjusting the position of the second sensor dog 32-2. The predetermined length ST can also be adjusted by adjusting drive time of forward rotation.

On the other hand, in the case of the operating state (extended state), for example, upon receiving an instruction to the standby state (retracted state) from the host system or the operation panel, the controller 3 controls the motor roller 29 of the stopper 2 to rotate backward until receiving a detection signal from the second sensor 30-2. By this control, the motor roller 29 is rotates backward. That is, the built-in motor of the motor roller 29 is driven, and, via the reducer of the motor roller 29, the roller pipe of the motor roller 29 rotates backward, as rotation axes, with the first and second shaft bodies of the motor roller 29 fixed to the first and second axial support members 28-1 and 28-2, respectively. When the roller pipe of the motor roller 29 rotates backward, the first and second groove cams 22-1 and 22-2 fixed to the roller pipe of the motor roller 29 are driven. That is, the first and second groove cams 22-1 and 22-2 pass through the eccentric points EP-1 and EP-2 eccentric from the center points CP-1 and CP-2 of the respective arc shapes of the first and second cam grooves 222-1 and 222-2, and axially rotate about the third straight line along the normal direction (Y direction) of the XZ plane as a rotation axis. When the first and second groove cams 22-1 and 22-2 rotate, the first and second cam followers 23-1 and 23-2 are respectively guided by the first and second cam grooves 222-1 and 222-2 to move. That is, the respective first and second follower bodies 231-1 and 231-2 of the first and second cam followers 23-1 and 23-2 respectively fitted in the first and second cam grooves 222-1 and 222-2 move along the first and second cam grooves 222-1 and 222-2, respectively, from the other end to one end in the circumferential direction, and thus the respective first and second shaft portions 232-1 and 232-2 of the first and second cam followers 23-1 and 23-2 also move. These movements are transmitted to the stop member 21 via the first and second cam follower holding portions 215-1 and 215-2 fixed and attached to the first and second shaft portions 232-1 and 232-2 of the first and second cam followers 23-1 and 23-2, respectively, and the stop member 21 also moves with these movements of the first and second cam followers 23-1 and 23-2. Here, the movement of the stop member 21 is restricted (guided) to movement in the Z direction by the first and second rail guides 25-1 and 25-2, and the stop member 21 moves in the Z direction, and the first surface part 211 of the stop member 21 is retracted from the travel path. Then, when the first sensor 30-1 detects the first sensor dog 32-1, the first sensor 30-1 transmits a detection signal to the controller 3, and in response to reception of this detection signal, the controller 3 stops backward rotation of the motor roller 29 as described above.

Note that in the above description, the controller 3 may confirm that the stopper 2 is in the operating state by confirming the detection of the second sensor dog 32-2 by the second sensor 30-2 before starting backward rotation of the motor roller 29.

As described above, the roller conveyor CV in the embodiment and the stopper 2 included in the roller conveyor CV move the stop member 21 in and out of the travel path by the cam mechanism, and therefore do not require supply of air.

The stopper of a fixed type such as a stop plate is relatively inexpensive, but it requires man-hours (labor) such as attaching the stop plate to a stop position of the object and detaching the stop plate when resuming the movement of the stopped object. The roller conveyor CV and the stopper 2 move the stop member 21 in and out of the travel path by the cam mechanism, and therefore do not require such man-hours (labor).

Since the roller conveyor CV and the stopper 2 use the groove cam of a planar cam in which the cam groove is formed in the plane, the cam mechanism can be achieved with a simple structure. Since the roller conveyor CV and the stopper 2 use the groove cam even when a force is applied by, for example, an object or the like to the stop member 21 from a direction intersecting the moving in-out direction (e.g., the horizontal direction in the moving direction DR), they can retract the stop member 21.

In the roller conveyor CV and the stopper 2, the motor roller for the roller conveyor can be used for the drive unit, and therefore a controller for the roller conveyor that controls the motor roller can be used as a controller of the stopper 2.

Since the roller conveyor CV and the stopper 2 move the stop member 21 in and out by the driving of the motor roller 29, they can reliably retract the stop member 21 as compared with a case where the stop member 21 is retracted by its own weight. In particular, even when a force is applied by, for example, an object or the like to the stop member 21 from a direction intersecting the moving in-out direction (e.g., the horizontal direction in the moving direction DR), the roller conveyor CV and the stopper 2 can retract the stop member 21.

Since the stop member 21 includes the step part 212 overlapping the end surface at one end in the Z direction of the base plate 27 as viewed from the Z direction (moving in-out direction), even when a defect occurs in the first sensor 30-1 for detecting the standby state, in the roller conveyor CV and the stopper 2, the step part 212 of the stop member 21 abuts on the end surface of the base plate 27, and therefore the movement of the stop member 21 can be stopped. Therefore, the roller conveyor CV and the stopper 2 have a function of fail safe. When the step part 212 abuts on the end surface of the base plate 27, the motor roller 29 is applied with a load, and therefore, by monitoring a current supplied to the built-in motor of the motor roller 29 by the controller 3, the controller 3 can detect the abutment and stop drive of backward rotation of the motor roller 29.

According to the present embodiment, the roller conveyor CV including the stopper 2 can be provided. When the roller conveyor CV includes the stopper disposed in the middle of the plurality of rollers 11, the roller conveyor CV can stop the object in the middle of the plurality of rollers 11 at a necessary timing by moving the stop member 21 out to the travel path, and can move again the object at a necessary timing by retracting the stop member 21 from the travel path. When the roller conveyor CV includes the stopper 2 arranged outside at the end of the plurality of rollers 11, the roller conveyor CV can stop the object at the end of the plurality of rollers 11 at a necessary timing by moving the stop member 21 out to the travel path, and can move again the object at a necessary timing by retracting the stop member 21 from the travel path.

When the stopper is an electric type using an electric cylinder, it requires a controller that controls the electric cylinder. In the roller conveyor CV, the controller 3 that controls the driving roller 11a of the roller conveyor CV can also control the drive unit (the motor roller 29 as an example thereof) of the stopper 2, and therefore it is not necessary to prepare another controller that controls the drive unit of the stopper 2.

Next, an example of operation in the roller conveyor CV including the stopper 2 will be described. FIG. 7 is a view for describing an example of the operation in the roller conveyor including the stopper. FIG. 7A is a view illustrating a scene in which the object (first object Ob-1) moved by the roller conveyor CV moves. FIG. 7B is a view illustrating a scene in which three of first to third objects Ob-1 to Ob-3 are stored in the travel path of the roller conveyor CV. FIG. 7C is a view illustrating a scene in which movement of the first object Ob-1 positioned at the head (most downstream) among the stored three first to third objects Ob-1 to Ob-3 illustrated in FIG. 7B is resumed.

In the example illustrated in FIG. 7, the stopper 2 is disposed so as to move the stop member 21 in and out between two of the rollers 11 adjacent to each other among the plurality of rollers 11.

When the roller conveyor CV is operated so as to move (convey) the object Ob, the stopper 2 is brought into the standby state (retracted state) as illustrated in FIG. 7A, and the stop member 21 is retracted from the travel path (conveyance path). Due to this, the object Ob moved by the plurality of rollers 11 continues its movement.

When the roller conveyor CV is operated so as to store a plurality of objects Ob in the travel path, the stopper 2 is brought into the operating state (extended state) as illustrated in FIG. 7B, and the stop member 21 is moved out to the travel path. Upon moving to the position of the stop member 21 of the stopper 2, the first object Ob-1 moved by the plurality of rollers 11 is stopped by this stop member 21. Here, when the first object Ob-1 is inclined with respect to the moving direction DR (X direction), since the first surface part 211 of the stop member 21 is flat, the inclination with respect to the moving direction DR in the first object Ob-1 is corrected by the first object Ob-1 abutting on this flat first surface part 211. Upon moving to the position of the stopped first object Ob-1, the second object Ob-2 moved by the plurality of rollers 11 abuts on this first object Ob-1 and is stopped by the first object Ob-1. Due to this, the first and second objects Ob-1 and Ob-2 are stored in the travel path. Upon moving to the position of the stopped second object Ob-2, the third object Ob-3 moved by the plurality of rollers 11 abuts on this second object Ob-2 and is stopped by the second object Ob-2. Due to this, the first to third objects Ob-1 to Ob-3 are stored in the travel path. Note that during storage of the first to third objects Ob-1 to Ob-3, the driving roller 11a on which the first to third objects Ob-1 to Ob-3 are placed may be stopped.

When the roller conveyor CV is operated so as to move again the plurality of objects Ob during storage, the stopper 2 is brought into the standby state from the operating state as illustrated in FIG. 7C, and the stop member 21 is retracted from the travel path. When the stop member 21 is retracted from the travel path, the first object Ob-1 at the head (most downstream) stopped by the stop member 21 resumes its movement and moves by the plurality of rollers 11. Here, after the movement of the first object Ob-1, the stopper 2 may be brought into the operating state from the standby state, whereby the second and third objects Ob-2 and Ob-3 are stored, and thereafter, at a predetermined timing, the stopper 2 may be brought into the standby state from the operating state, and the movement of the second object Ob-2 may be resumed. Due to this, an interval (fifth interval) between the first object Ob-1 and the second object Ob-2 can be adjusted. Similarly, an interval (sixth interval) between the second object Ob-2 and the third object Ob-3 can also be adjusted.

Note that although one stopper 2 is disposed on the roller conveyor CV in the above, a plurality of stoppers 2 may be disposed.

The stopper 2 described above includes the groove cam 22 that forms the arc-shaped cam groove 222 and is axially driven about the third straight line passing through the eccentric point EP as a rotation axis, but the shape of the groove cam 22 is not limited to this, and may be any shape that allows the stop member 21 to move in and out of the travel path by a cam mechanism.

FIG. 8 is a view for describing a modified form of the groove cam used in the stopper. FIG. 8B is a plan view of the groove cam, FIG. 8A is a cross-sectional view viewed from a cross-section line II-II illustrated in FIG. 8B, and FIG. 8C is a side view of the groove cam. For example, the cam mechanism includes a groove cam 22a provided with a cam groove of a recess or a through opening illustrated in FIG. 8 in place of the groove cam 22 illustrated in FIG. 4A, and the cam follower 23 illustrated in FIG. 4B guided by the cam groove and engaged with the stop member 21. The cam groove 222a has a shape including a substantially U-shape with rounded corners in a plane formed by the first straight line along the moving direction DR of the travel path and the second straight line along the moving in-out direction. Similarly to the above, the moving direction DR is the X direction, the first straight line is a straight line parallel to the X axis, the moving in-out direction is the Z direction, the second straight line is a straight line parallel to the Z axis, and a plane formed by the first and second straight lines is the XZ plane (plane parallel to the XZ plane). The retractable unit further includes a drive unit that axially drives the groove cam 22a about, as a rotation axis, the third straight line passing through an eccentric point EPa eccentric to one side from a center position inside the substantially U-shape and extending along a normal direction of the plane. Similarly to the above, the normal direction of the plane is the Y direction, and the third straight line is a straight line parallel to the Y axis. The drive unit is a motor roller for a roller conveyor used for a roller conveyor and incorporating a motor.

More specifically, such a groove cam 22a is configured to include a pair of first and second groove cams 22a-1 and 22a-2 similarly to the above. Since these first and second groove cams 22a-1 and 22a-2 have the same shape, they will be mainly described below as the groove cam 22a. As illustrated in FIG. 8B, the groove cam 22a is configured to include a groove cam body 221a, which is a plate-like member having a substantially D-shape in plan view, and the plate-like groove cam body 221a is provided with two cam grooves 222a having a substantially U-shape with rounded corners in plan view, the cam groove being a recess or a through opening, i.e., the through opening in the example illustrated in FIG. 8B. In the example illustrated in FIG. 8, in the cam groove 222a, one end of the substantially U-shape is slightly extended obliquely in the outward direction. A position of the eccentric point EPa eccentric to one side (eccentric to the lower side in the Z direction in the example illustrated in FIG. 8B) from a center position in the Z direction inside the substantially U-shape is provided with a shaft body insertion opening part 223a of a through opening for inserting the shaft body of the motor roller 29 as an example of the drive unit. The size of the substantially U-shape of the cam groove 222a (length in the extension direction of the cam groove 222a) and the position of the eccentric point EPa are appropriately set according to a moving in-out length of the first surface part 211 in the stop member 21 with respect to the travel path. In the groove cam 22 described above, the center point CP of the arc shape coincides with the center point in a case where the groove cam body 221 is not cut out and is circular, but in the groove cam 22a illustrated in FIG. 8, the center point of the cam groove 222a does not coincide with the center point of the groove cam body 221a.

In the above description, the stopper 2 is included in the roller conveyor CV, but the stopper 2 may be included in a belt conveyor including one or a plurality of sub conveyors including a plurality of rollers juxtaposed along one direction and a conveying belt stretched around the plurality of rollers. Such a belt conveyor is known, and is disclosed in, for example, JP 2018-158826 A. In this case, the stopper 2 is disposed so as to move the stop member in and out at least one of between two sub conveyors adjacent to each other among the plurality of sub conveyors and outside in the one direction of the sub conveyor positioned at an end of the one or the plurality of sub conveyors. When the belt conveyor includes the stopper 2 disposed in the middle of the plurality of sub conveyors, the belt conveyor can stop the object in the middle at a necessary timing by moving the stop member 21 out to the travel path, and can move again the object at a necessary timing by retracting the stop member 21 from the travel path. When the belt conveyor includes the stopper 2 arranged outside at the end of the plurality of sub conveyors, the belt conveyor can stop the object at the end at a necessary timing by moving the stop member 21 out to the travel path, and can move again the object at a necessary timing by retracting the stop member 21 from the travel path.

The present description discloses techniques of various aspects as described above, and main techniques thereof are summarized below.

A stopper according to one aspect is a stopper that stops an object moving along a travel path, the stopper including: a stop member for stopping the object; and a retractable unit that moves the stop member in and out of the travel path by a cam mechanism.

Since such a stopper moves the stop member in and out of the travel path by the cam mechanism, and therefore it does not require supply of air.

In another aspect, in the stopper described above, the cam mechanism includes a groove cam provided with a cam groove of a recess or a through opening, and a cam follower guided by the cam groove and engaged with the stop member, the cam groove has an arc shape in a plane formed by a first straight line along a moving direction of the travel path and a second straight line along the moving in-out direction, and the retractable unit further includes a drive unit that axially drives the groove cam about, as a rotation axis, a third straight line passing through an eccentric point eccentric from a center point of the arc shape and extending along a normal direction of the plane. In another aspect, in the stopper described above, the cam mechanism includes a groove cam provided with a cam groove of a recess or a through opening, and a cam follower guided by the cam groove and engaged with the stop member, the cam groove has a shape including a U-shape with rounded corners in a plane formed by a first straight line along a moving direction of the travel path and a second straight line along the moving in-out direction, and the retractable unit further includes a drive unit that axially drives the groove cam about, as a rotation axis, a third straight line passing through an eccentric point eccentric to one side relative to a center position inside the U-shape and extending along a normal direction of the plane.

Since these stoppers each use the groove cam of a planar cam in which the cam groove is formed in the plane, the cam mechanism can be achieved with a simple structure. Even when a force is applied by, for example, an object or the like to the stop member from a direction intersecting the moving in-out direction (e.g., the horizontal direction), since the stopper uses the groove cam, it can retract the stop member.

In another aspect, in each of the stoppers described above, the drive unit is a motor roller for a roller conveyor used for a roller conveyor and incorporating a motor.

In such a stopper, the motor roller for the roller conveyor can be used for the drive unit, and therefore a controller for the roller conveyor that controls the motor roller can be used as a controller of the stopper. When the stopper is used for a roller conveyor, the controller that controls the motor roller of the roller conveyor can also control the drive unit (motor roller as an example thereof) of the stopper, and therefore it is not necessary to prepare another controller that controls the drive unit of the stopper.

A roller conveyor according to another aspect is a roller conveyor including a plurality of rollers juxtaposed along one direction, the roller conveyor further including any of the stoppers described above, the stopper being disposed so as to move the stop member in and out at least one of between two rollers adjacent to each other among the plurality of rollers and outside in the one direction of a roller positioned at an end of the plurality of rollers.

A belt conveyor according to one aspect is a belt conveyor including one or a plurality of sub conveyors including a plurality of rollers juxtaposed along one direction and a conveying belt stretched around the plurality of rollers, the belt conveyor further including any of the stoppers described above, the stopper being disposed so as to move the stop member in and out at least one of between two sub conveyors adjacent to each other among the plurality of sub conveyors and outside in the one direction of a sub conveyor positioned at an end of the one or the plurality of sub conveyors.

According to the above, it is possible to provide the roller conveyor and the belt conveyor including any of the stoppers described above. When the roller conveyor and the belt conveyor include a stopper disposed in the middle, the roller conveyor can stop the object in the middle at a necessary timing by moving the stop member out to the travel path, and can move again the object at a necessary timing by retracting the stop member from the travel path. When the roller conveyor and the belt conveyor include a stopper disposed outside at an end, the roller conveyor can stop the object at the end at a necessary timing by moving the stop member out to the travel path, and can move again the object at a necessary timing by retracting the stop member from the travel path.

In order to express the present invention, the present invention has been appropriately and sufficiently described above through the embodiment with reference to the drawings, but it should be recognized that a person skilled in the art can easily change and/or improve the above-described embodiment. Therefore, unless a change form or an improvement form carried out by a person skilled in the art is at a level departing from the scope of the claims described in the claims, the change form or the improvement form is interpreted to be included in the scope of the claims.

INDUSTRIAL APPLICABILITY

According to the present invention, it is possible to provide the stopper, the roller conveyor, and the belt conveyor.

The invention claimed is:

1. A stopper that stops an object moving along a travel path, the stopper comprising:
   a stop member for stopping the object; and
   a retractable unit that moves the stop member in and out of the travel path by a cam mechanism,
   wherein the cam mechanism includes a groove cam provided with a cam groove of a recess or a through opening, and a cam follower guided by the cam groove and engaged with the stop member,
   the cam groove has an arc shape in a plane formed by a first straight line along a moving direction of the travel path and a second straight line along a moving in-out direction, and
   the retractable unit further includes a drive unit that axially drives the groove cam about, as a rotation axis, a third straight line passing through an eccentric point eccentric from a center point of the arc shape and extending along a normal direction of the plane.

2. A stopper that stops an object moving along a travel path, the stopper comprising:
   a stop member for stopping the object; and
   a retractable unit that moves the stop member in and out of the travel path by a cam mechanism,
   wherein the cam mechanism includes a groove cam provided with a cam groove of a recess or a through opening, and a cam follower guided by the cam groove and engaged with the stop member,
   the cam groove has a shape including a U-shape with rounded corners in a plane formed by a first straight line along a moving direction of the travel path and a second straight line along a moving in-out direction, and
   the retractable unit further includes a drive unit that axially drives the groove cam about, as a rotation axis, a third straight line passing through an eccentric point eccentric to one side relative to a center position inside the U-shape and extending along a normal direction of the plane.

3. The stopper according to claim 1, wherein the drive unit is a motor roller for a roller conveyor used for a roller conveyor and incorporating a motor.

4. A roller conveyor including a plurality of rollers juxtaposed along one direction, the roller conveyor further comprising
   the stopper according to claim 1, the stopper being disposed so as to move the stop member in and out at least one of between two rollers adjacent to each other among the plurality of rollers and outside in the one direction of a roller positioned at an end of the plurality of rollers.

5. A belt conveyor including one or a plurality of sub conveyors including a plurality of rollers juxtaposed along one direction and a conveying belt stretched around the plurality of rollers, the belt conveyor further comprising
   the stopper according to claim 1, the stopper being disposed so as to move the stop member in and out at least one of between two sub conveyors adjacent to each other among the plurality of sub conveyors and outside in the one direction of a sub conveyor positioned at an end of the one or the plurality of sub conveyors.

6. The stopper according to claim 2, wherein the drive unit is a motor roller for a roller conveyor used for a roller conveyor and incorporating a motor.

7. A roller conveyor including a plurality of rollers juxtaposed along one direction, the roller conveyor further comprising
   the stopper according to claim 2, the stopper being disposed so as to move the stop member in and out at least one of between two rollers adjacent to each other among the plurality of rollers and outside in the one direction of a roller positioned at an end of the plurality of rollers.

8. A roller conveyor including a plurality of rollers juxtaposed along one direction, the roller conveyor further comprising
   the stopper according to claim 3, the stopper being disposed so as to move the stop member in and out at least one of between two rollers adjacent to each other among the plurality of rollers and outside in the one direction of a roller positioned at an end of the plurality of rollers.

9. A belt conveyor including one or a plurality of sub conveyors including a plurality of rollers juxtaposed along one direction and a conveying belt stretched around the plurality of rollers, the belt conveyor further comprising
   the stopper according to claim 8, the stopper being disposed so as to move the stop member in and out at least one of between two sub conveyors adjacent to each other among the plurality of sub conveyors and outside in the one direction of a sub conveyor positioned at an end of the one or the plurality of sub conveyors.

10. A belt conveyor including one or a plurality of sub conveyors including a plurality of rollers juxtaposed along one direction and a conveying belt stretched around the plurality of rollers, the belt conveyor further comprising
    the stopper according to claim 3, the stopper being disposed so as to move the stop member in and out at least one of between two sub conveyors adjacent to each other among the plurality of sub conveyors and outside in the one direction of a sub conveyor positioned at an end of the one or the plurality of sub conveyors.

* * * * *